(12) United States Patent
Ku

(10) Patent No.: US 8,907,532 B2
(45) Date of Patent: Dec. 9, 2014

(54) VOICE COIL MOTOR

(75) Inventor: Ping-Han Ku, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 487 days.

(21) Appl. No.: 13/207,463

(22) Filed: Aug. 11, 2011

(65) Prior Publication Data

US 2012/0306293 A1 Dec. 6, 2012

(51) Int. Cl.
*H02K 41/035* (2006.01)
*H02K 1/27* (2006.01)
*H02K 1/18* (2006.01)

(52) U.S. Cl.
CPC ............ *H02K 41/0356* (2013.01); *H02K 1/278* (2013.01); *H02K 1/185* (2013.01)
USPC ...................................... 310/12.16

(58) Field of Classification Search
CPC .......... H02K 41/0354; H02K 41/0356; H02K 41/0358; H02K 33/16; H02K 33/18
USPC .................. 310/12.16, 12.22, 12.26; 359/824
See application file for complete search history.

(56) References Cited

U.S. PATENT DOCUMENTS

| | | | | |
|---|---|---|---|---|
| 7,378,763 B2 * | 5/2008 | Jack et al. | ................... | 310/12.06 |
| 7,586,701 B2 * | 9/2009 | Kim et al. | ...................... | 359/824 |
| 8,446,476 B2 * | 5/2013 | Ku | ............................. | 348/208.11 |
| 2007/0247539 A1 * | 10/2007 | Ho et al. | ........................ | 348/335 |
| 2008/0180820 A1 * | 7/2008 | Sata et al. | ..................... | 359/824 |
| 2009/0073585 A1 * | 3/2009 | Yamashita | ..................... | 359/824 |
| 2009/0179505 A1 * | 7/2009 | Hoppe et al. | ................ | 310/12.17 |
| 2009/0300905 A1 * | 12/2009 | Chou | .............................. | 29/732 |
| 2010/0142065 A1 * | 6/2010 | Liao | ............................. | 359/824 |
| 2010/0246035 A1 * | 9/2010 | Yamashita et al. | ............. | 359/824 |
| 2011/0031822 A1 * | 2/2011 | Chou | ......................... | 310/12.16 |
| 2011/0052164 A1 * | 3/2011 | Huang et al. | .................... | 396/55 |
| 2011/0141320 A1 * | 6/2011 | Huang et al. | ............... | 348/240.3 |
| 2011/0205424 A1 * | 8/2011 | Nakashima et al. | ......... | 348/360 |

FOREIGN PATENT DOCUMENTS

WO WO 2010055718 A1 * 5/2010 ........... H02K 41/035

* cited by examiner

*Primary Examiner* — Burton Mullins
*Assistant Examiner* — Eric Johnson
(74) *Attorney, Agent, or Firm* — Novak Druce Connolly Bove + Quigg LLP

(57) ABSTRACT

A voice coil motor (VCM) includes a fixed assembly and a movable assembly. The fixed assembly includes a fixed bracket and a coil group. The fixed bracket is substantially tri-columnar in shape and includes three sidewalls supporting the coil group thereon, and defines a first receiving cavity between the three sidewalls. The coil group is arranged on the three sidewalls. The movable assembly includes a movable barrel movably received in the first receiving cavity, and a magnet group. The movable barrel is also substantially tri-columnar in shape and includes three external surfaces. The magnet group is arranged on the three external surfaces of the movable barrel and spatially opposite to the coil group.

7 Claims, 4 Drawing Sheets

VOICE COIL MOTOR

BACKGROUND

1. Technical Field

The present disclosure relates to motors, and particularly to a voice coil motor.

2. Description of Related Art

Voice coil motors (VCMs) are widely used, for example, as lens actuators in camera modules. Camera modules are becoming progressively more miniaturized, and thus VCMs are correspondingly being required to be made smaller and smaller.

A typical VCM includes a fixed frame, a lens retainer movably received in the frame along the optical axis of the VCM and wrapped by a coil. The fixed frame is made from magnets. The lens retainer is movable in the fixed frame along the optical axis of the VCM, due to an interaction between the coil and the magnetic. However, due to the fixed frame being made from magnets, the manufacture process of the fixed frame is complex, and the production cost is high.

Therefore, it is desirable to provide a voice coil motor, which can overcome the limitations described.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Embodiments of the present disclosure will now be described in detail with reference to the drawings.

Figure 1:
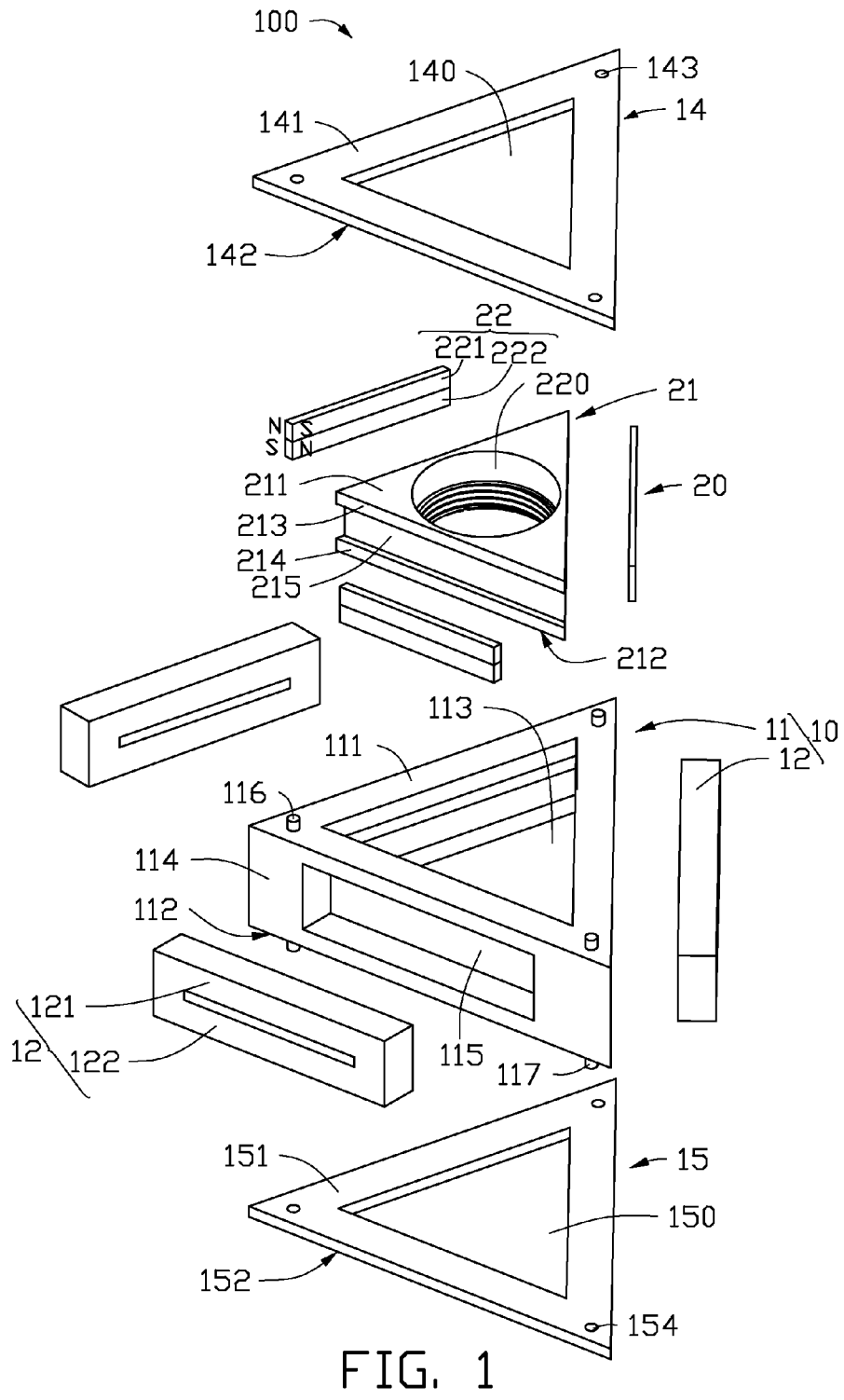
FIG. 1 is an exploded, isometric view of a voice coil motor, according to a first embodiment.
Figure 2:
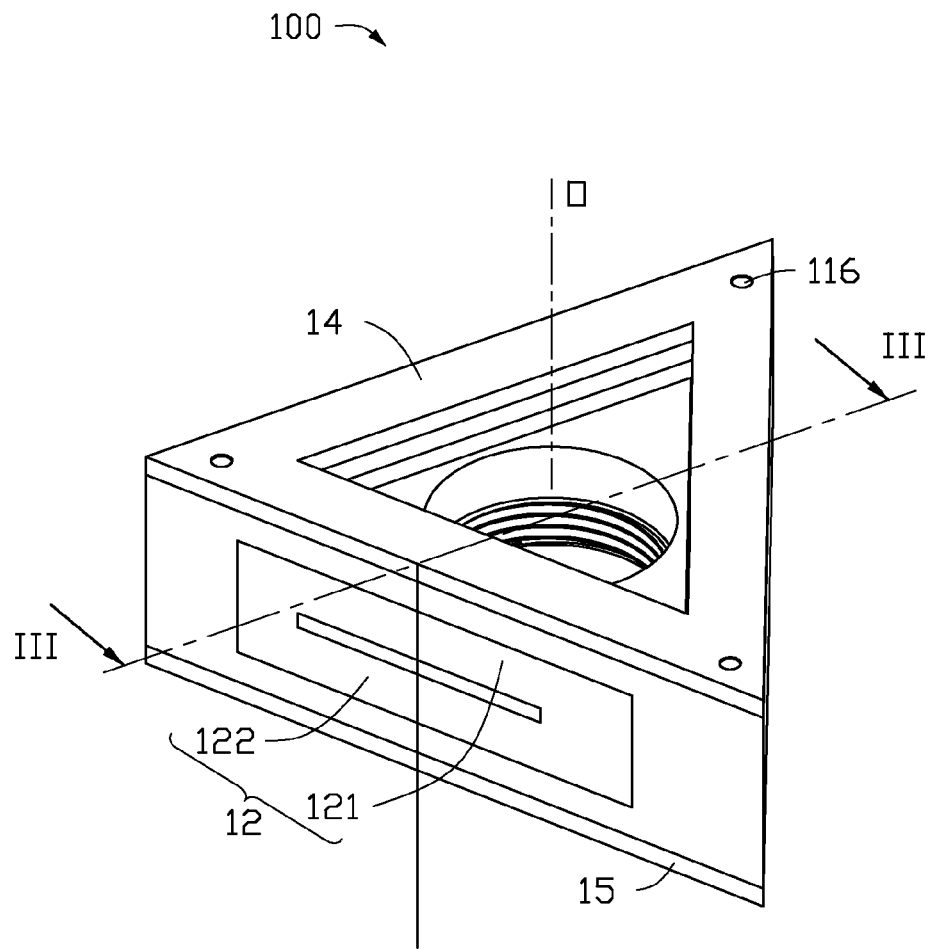
FIG. 2 is an assembled, isometric view of the voice coil motor of FIG. 1.
Figure 3:
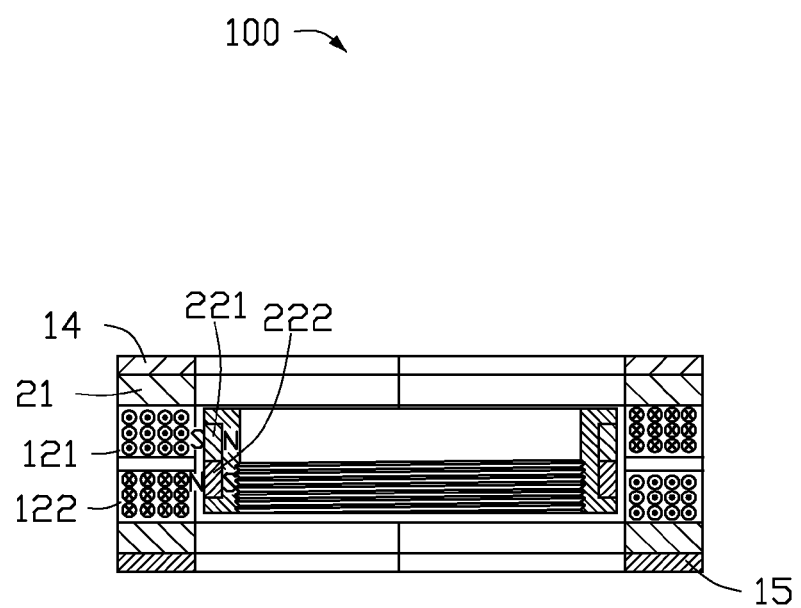
FIG. 3 is a cross-sectional view taken along line III-III of FIG. 1.

Referring to FIGS. 1-3, a voice coil motor (VCM) 100, according to a first embodiment, includes a fixed assembly 10 and a movable assembly 20 movably received in the fixed assembly 10, a cover 14, and a support base 15. The cover 14 and the support base 15 are respectively arranged on two opposite ends of the fixed assembly 10.

The fixed assembly 10 includes a fixed bracket 11 and a coil group. The fixed bracket 11 is made of plastic. In the embodiment, the coil group includes three coils 12 arranged on the fixed bracket 11. The fixed bracket 11 includes a top surface 111 and a bottom surface 112 facing away from the top surface 111, and defines a first receiving cavity 113 passing through the top surface 111 and the bottom surface 112. In the embodiment, the fixed bracket 11 is substantially tri-columnar in shape and includes three sidewalls 114. Each sidewall 114 defines a receiving recess 115 passing therethrough for receiving a corresponding coil 12. The receiving recess 115 communicates with the first receiving cavity 113.

The fixed bracket 11 also includes three first locating members 116 arranged on the top surface 111, and three second locating members 117 arranged on the bottom surface 112. In the embodiment, the first locating member 116 and the second locating member 117 are locating pins, and are integrally formed with the fixed bracket 11. The first locating members 116 are respectively located on/at three corners of the top surface 111, and the second locating members 117 are respectively located on/at three corners of the bottom surface 112.

It should be noted that each of the receiving recesses 115 also can be defined in an inner surface or an outer surface of the corresponding sidewall 114.

Each coil 12 includes an upper portion 121 and a lower portion 122. When a current flows the coils 12, the current flowing directions of the upper portion 121 and the lower portion 122 are opposite to each other.

The cover 14 includes an upper surface 141, a lower surface 142 facing away from the upper surface 141, and three third locating members 143 spatially corresponding to the first locating members 116. The cover 14 defines a through hole 140 passing through the upper surface 141 and the lower surface 142. In the embodiment, the third locating member 143 is a hole. The shape and size of the third locating member 143 corresponds to that of the first locating members 116. As such, the first locating member 116 is capable of being received in a corresponding third locating member 143 to assemble the cover 14 on the top surface 111 of the fixed bracket 11.

The support base 15 includes a top surface 151, a bottom surface 152 facing away from the top surface 151, and three fourth locating members 154 spatially corresponding to the second locating members 117. The support base 15 defines an opening 150 passing through the top surface 151 and the second surface 152. In the embodiment, the fourth locating member 154 is a hole. The shape and size of the fourth locating member 154 corresponds to that of the second locating member 117. As such, each of the second locating members 117 is capable of being received in a corresponding fourth locating member 154 to assemble the support base 15 on the bottom surface 112 of the fixed bracket 11.

The movable assembly 20 includes a movable barrel 21 movably received in the first receiving cavity 113 and a magnet group arranged on the movable barrel 21. In the embodiment, the magnet group includes three magnets 22.

In the embodiment, the movable barrel 21 is also substantially tri-columnar, and includes a first surface 211 facing the cover 14 and a second surface 212 facing away from the first surface 211. The movable barrel 21 defines a second receiving cavity 220 passing through the first surface 211 and the second surface 212. The movable barrel 21 also includes three external surfaces 213. Each external surface 213 defines a groove 215 for receiving a corresponding magnet 22.

Each magnet 22 is spatially opposite to a corresponding coil 12, and each magnet 22 includes an upper magnet 221 spatially corresponding to the upper portion 121, and a lower magnet 222 spatially corresponding to the lower portion 122. An N magnetic pole of the upper magnet 221 faces the upper portion 121, and an S magnetic pole of the upper magnet 221 faces away from the upper portion 121. An N magnetic pole of the lower magnet 222 faces away from the lower portion 122, and an S magnetic pole of the lower magnet 222 faces the lower portion 122, such that the movable barrel 21 moves along the central axis of the first receiving cavity 113 relative to the fixed bracket 11 with Lorenz Forces. These forces are generated by interactions between magnetic fields generated by the coils 12 with current flowing therein and the magnetic fields generated by the corresponding magnet 22.

Figure 4:
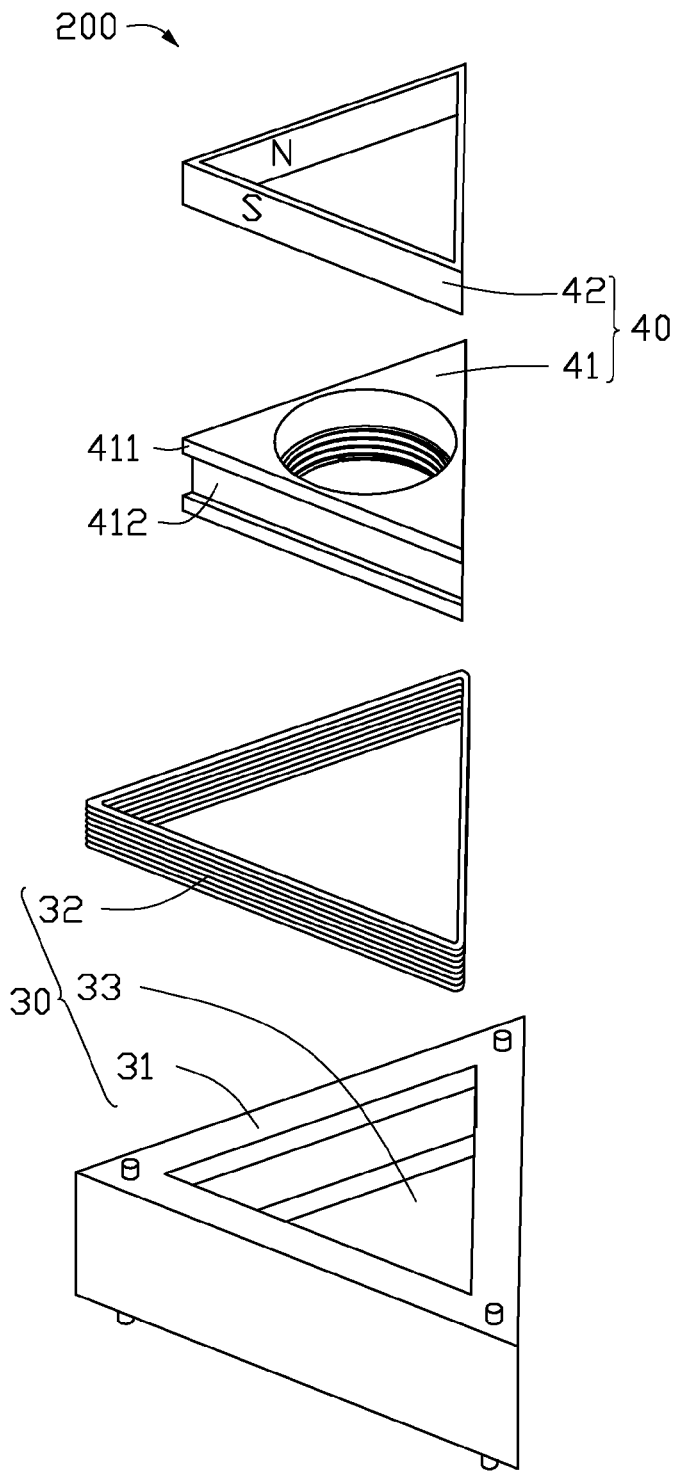
FIG. 4 is an exploded, isometric view of a voice coil motor, according to a second embodiment.

Referring to FIG. 4, a VCM 200 in accordance with a second exemplary embodiment is disclosed. The VCM 200 is essentially similar to the VCM 100 of the first exemplary embodiment, except for the fixed assembly 30 and a movable assembly 40. In this embodiment, the fixed assembly 30 includes a fixed bracket 31 and a coil group 32 arranged on the fixed bracket 31. In the embodiment, the fixed bracket 31 is substantially tri-columnar in shape, and the coil group 32 is substantially triangle-ring in shape. The fixed bracket 31 defines a first receiving cavity 33 with a triangular shape. The coil group 32 is coaxial with the first receiving cavity 33 and is arranged on the inner surface of the fixed bracket 31.

The assembly 40 includes a movable barrel 41 received in the first receiving cavity 33 and a ring-shaped magnet 42. The movable barrel 41 is substantially tri-columnar in shape, and the ring-shaped magnet 42 is substantially triangle-ring in shape. The movable barrel 41 includes three external surface 411. Each external surface 411 of the movable barrel 41 defines a receiving groove 412. The receiving grooves 412 of the three external surface 411 are communicated with each other and receive the ring-shaped magnet 42 therein.

In the embodiment, an S magnetic pole of the ring-shaped magnet 42 faces the coil group 32, and the N magnetic pole of the ring-shaped magnet 42 faces away from the coil group 32, such that the movable barrel 41 moves along the central axis of the first receiving cavity 33 relative to the fixed bracket 41 by Lorenz Forces, generated by interactions between magnetic fields generated by the coil group 32 with current flowing therein and magnetic fields generated by the corresponding ring-shaped magnet 42.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the scope of the disclosure but do not restrict the scope of the disclosure.

What is claimed is:

1. A voice coil motor (VCM) comprising:
   a fixed assembly comprising a fixed bracket and a coil group, the fixed bracket being substantially triangular in shape and comprising three sidewalls supporting the coil group thereon, the fixed bracket defining a first receiving cavity between the three sidewalls; and
   a movable assembly comprising a movable barrel movably received in the first receiving cavity, and a magnet group, the movable barrel being also substantially triangular in shape and comprising three external surfaces, wherein the coil group comprises three coils, each sidewall of the fixed bracket defines a receiving recess passing through a corresponding sidewall of the fixed bracket for respectively receiving a corresponding coil, the magnet group comprises three magnets, each external surface of the movable barrel defines a groove receiving a corresponding magnet, each magnet is spatially opposite to a corresponding coil, wherein the fixed bracket comprises a top surface and a bottom surface facing away from the top surface, the first receiving cavity passes through the top surface and the bottom surface, the VCM further comprises a cover, the fixed bracket comprises three first locating members arranged on the top surface, the cover comprises an upper surface, a lower surface facing away from the upper surface, and three second locating members on the lower surface, the second locating members spatially correspond to the respective first locating members, the cover is assembled on the top surface of the fixed bracket through the engagement of the three first locating members with the three second locating members.

2. The VCM of claim 1, wherein each of the first locating members is a locating pin, each of the second locating members is a hole, the shape and size of each second locating member corresponds to that of each first locating member.

3. The VCM of claim 1, wherein the first locating members are integrally formed with the fixed bracket, the three first locating members are respectively located at three corners of the top surface.

4. The VCM of claim 1, further comprising a support base, wherein the fixed bracket also comprises three third locating members arranged on the bottom surface of the fixed bracket, the support base comprises a top surface, a bottom surface facing away from the top surface, and three fourth locating members on the top surface of the support base, the three fourth locating members spatially correspond to the three third locating members, the support base is assembled on the bottom surface of the fixed bracket through the engagement of the three third locating members with the three fourth locating members.

5. The VCM of claim 4, wherein each third locating member is a locating pin, each fourth locating member is a hole, the shape and size of each fourth locating member corresponds to that of each third locating member.

6. The VCM of claim 5, wherein the third locating members are integrally formed with the fixed bracket, the three third locating members are respectively located at the three corners of the bottom surface.

7. The VCM of claim 1, wherein the movable barrel comprises a first surface facing the cover and a second surface facing away from the first surface, the movable barrel defines a second receiving cavity passing through the first surface and the second surface.

* * * * *